(12) United States Patent
He

(10) Patent No.: US 10,977,947 B2
(45) Date of Patent: Apr. 13, 2021

(54) METHOD FOR VEHICLE BLIND ZONE DETECTION

(71) Applicant: VIA Technologies, Inc., Taipei (TW)

(72) Inventor: Juan He, Shanghai (CN)

(73) Assignee: VIA TECHNOLOGIES, INC., Taipei (TW)

( * ) Notice: Subject to any disclaimer, the term of this patent is extended or adjusted under 35 U.S.C. 154(b) by 221 days.

(21) Appl. No.: 16/278,213

(22) Filed: Feb. 18, 2019

(65) Prior Publication Data

US 2020/0160717 A1 May 21, 2020

(30) Foreign Application Priority Data

Nov. 19, 2018 (CN) .......................... 201811376433.1

(51) Int. Cl.
    *G08G 1/16*     (2006.01)
    *G06K 9/00*     (2006.01)
    (Continued)

(52) U.S. Cl.
    CPC ......... *G08G 1/167* (2013.01); *G06K 9/00805* (2013.01); *B60Q 9/008* (2013.01);
    (Continued)

(58) Field of Classification Search
    CPC .... G08G 1/167; G06K 9/00805; B60Q 9/008; B60R 1/12; B60R 2001/1253;
    (Continued)

(56) References Cited

U.S. PATENT DOCUMENTS

| | | | |
|---|---|---|---|
| 6,215,898 B1 * | 4/2001 | Woodfill | G06K 9/32 |
| | | | 382/154 |
| 6,269,175 B1 * | 7/2001 | Hanna | G06T 5/50 |
| | | | 382/107 |

(Continued)

FOREIGN PATENT DOCUMENTS

| | | | |
|---|---|---|---|
| CN | 108198208 A | | 6/2018 |
| CN | 108280444 A | * | 7/2018 |

(Continued)

*Primary Examiner* — Jonathan M Dager
*Assistant Examiner* — Jean W Charleston
(74) *Attorney, Agent, or Firm* — McClure, Qualey & Rodack, LLP

(57) ABSTRACT

A method for vehicle blind zone detection, applied to an electronic device coupled to one or more cameras arranged on a vehicle, the method comprising: setting a capture zone in a current frame image captured by the camera and detecting an object entering the capture zone in the current frame image, wherein the object meeting a capture criterion and a location information of the object meeting the capture criterion are added into a tracking list; performing tracking operations on an existing object, which has been detected and thus added to the tracking list, in one or more previous frame images preceding the current frame image captured by the camera, to obtain a new location information of the existing object in the current frame image, and determining whether to have the existing object remained in the tracking list in accordance with the new location information of the existing object and the detection scope; and making a warning determination in accordance with the location information in the current frame image for all the objects remained in the tracking list.

10 Claims, 3 Drawing Sheets

(51) Int. Cl.
*B60Q 9/00* (2006.01)
*B60R 1/12* (2006.01)
*G01S 13/931* (2020.01)

(52) U.S. Cl.
CPC ......... *B60R 1/12* (2013.01); *B60R 2001/1253* (2013.01); *G01S 13/931* (2013.01)

(58) Field of Classification Search
CPC ................ B60R 1/00; B60R 2300/802; B60R 2300/105; G01S 13/931
USPC .......................................................... 701/301
See application file for complete search history.

(56) References Cited

U.S. PATENT DOCUMENTS

| | | | | |
|---|---|---|---|---|
| 6,618,672 B2* | 9/2003 | Sasaki | ...................... | B60R 1/00 340/435 |
| 8,867,810 B2* | 10/2014 | Nordberg | .............. | G06T 11/005 382/131 |
| 2009/0037104 A1* | 2/2009 | Basson | ................... | G08G 1/166 701/431 |
| 2010/0053320 A1 | 3/2010 | Chen et al. | | |
| 2010/0231593 A1* | 9/2010 | Zhou | ..................... | H04N 19/537 345/428 |
| 2010/0324823 A1* | 12/2010 | Kobayashi | ............ | B60W 30/09 701/301 |
| 2012/0008129 A1* | 1/2012 | Lu | ........................... | G01S 17/89 356/5.01 |
| 2017/0337435 A1* | 11/2017 | Uliyar | ................... | G08G 1/0129 |
| 2019/0362159 A1* | 11/2019 | Cooley | ................... | H04L 67/18 |

FOREIGN PATENT DOCUMENTS

| | | |
|---|---|---|
| CN | 108280444 A | 7/2018 |
| TW | 201009757 A | 3/2010 |

* cited by examiner

METHOD FOR VEHICLE BLIND ZONE DETECTION

CROSS-REFERENCE TO RELATED APPLICATION

This application claims the priority benefit of China application serial no. 201811376433.1, filed on Nov. 19, 2018. The entirety of the above-mentioned patent application is hereby incorporated by reference herein and made a part of this specification.

TECHNICAL FIELD

The present disclosure relates to a method for vehicle blind zone detection, in particular, to a method for vehicle blind zone detection based on optical flow method.

BACKGROUND

As the increasing of the number of motor vehicles, the volume of vehicles on the traffic roads also increases rapidly, resulting in a deteriorating trend of traffic accidents. Especially for general vehicles, the blind zones for the rear view mirrors on both sides of the vehicle may make the driver not able to realize the situation on the sides of the vehicle clearly, having the risk of car accident increased. Vehicle blind zone detecting technology can effectively compensate for the increased risk of car accidents, improving driving safety significantly, and greatly reducing the traffic accidents caused by the blind zones.

The current vehicle blind zone detecting technologies are mainly realized with radar devices, visual principles or visual processing. Radar-based blind zone detecting technologies mainly detect surrounding obstacles by providing a radar system in the vehicle, which has the advantage of high sensitivity of detection; but its disadvantages are obvious as well, for example, no intuitive visual information can be provided for the driver; moving objects cannot be distinguished from the background; and unnecessary false alarms could be produced since warning determinations depending on the moving directions and trends are not available.

The technologies based on visual principles or visual processing includes two major types. One is to reduce or even eliminate the blind zone by expanding the visual field of the rear view mirrors on the sides, e.g. by replacing conventional plane mirrors with various types of curvature mirror, so as to reduce the risk caused by blind zones, which, however, will cause severe deformation of the images seen by the driver and make determinations about information such as the distance impossible. The other is to set up cameras on sides as visual sensors, which has better practical effect by providing drivers with intuitive visual information, and reduces accident rate by effectively providing the visual information as assistance for the driver.

However, there are still many problems in the blind zone detections based on computer visual processing technologies, mainly including low accuracy and excessively large calculation amount. If a high accuracy is desired, usually, a complex algorithm of machine learning is usually required for support. Moreover, with this kind of method, only warnings on certain types of objects, such as vehicles, can be given. If it is desired to give warnings on multiple types of objects, the requirement for the computing capability of the equipment will be very demanding; and the real-time performance can hardly meet actual needs.

SUMMARY

In order to solve the problems existing in the prior art, the present disclosure provides a method for vehicle blind zone detection based on the optical flow method, which uses a computer visual processing technology based on the optical flow method to detect the blind zones of a vehicle.

The method for vehicle blind zone detection according to an embodiment of the present disclosure is applied to an electronic device provided on a vehicle to detect in a detection scope. The electronic device is coupled to one or more cameras provided on the vehicle. The method comprises: setting a capture zone in a current frame image captured by the camera and detecting an object entering the capture zone in the current frame image, wherein the object meeting a capture criterion and a location information of the object meeting the capture criterion are added into a tracking list; performing tracking operations on an existing object, which has been detected and thus added to the tracking list, in one or more previous frame images preceding the current frame image captured by the camera, to obtain a new location information of the existing object in the current frame image, and determining whether to have the existing object remained in the tracking list in accordance with the new location information of the existing object and the detection scope; and making a warning determination in accordance with the location information in the current frame image for all the objects remained in the tracking list.

According to the method for vehicle blind zone detection as described above, the one or more cameras are mounted on the left side and/or the right side of the vehicle, the detection scope includes a range on the left side of the vehicle from the left rear view mirror to a monitored segment posterior to the left rear of the vehicle and/or a range on the right side of the vehicle from the right rear view mirror to a monitored segment posterior to the right rear of the vehicle, and the monitored segment is corresponding to the bottom of the capture zone.

According to the method for vehicle blind zone detection as described above, the method further comprises: generating a sequence of images for a plurality of frame images captured by the camera and gray-scaling the plurality of frame images, and resizing the plurality of frame images, wherein the plurality of frame images include the current frame image and the one or more previous frame images.

According to the method for vehicle blind zone detection as described above, setting a capture zone in a current frame image captured by the camera and detecting an object entering the capture zone in the current frame image includes: generating, in the capture zone, an array of monitored points including a plurality of monitored points, and dividing the array of monitored points into a plurality of monitored windows, wherein each of the monitored windows includes a part of the plurality of monitored points; calculating, by optical flow method, a motion displacement of each of the plurality of monitored points in the current frame image; and for each of the monitored windows, if the directions of motion displacements of all the monitored points in the monitored window are forward, checking consistency in the motion displacements of all the monitored points in the monitored window; otherwise, no checking on the consistency in the motion displacements of the monitored points in the monitored window.

According to the method for vehicle blind zone detection as described above, checking consistency in the motion displacements of all the monitored points in the monitored window includes: for each column of monitored points in the monitored window, calculating a difference between a maximum value and a minimum value of vertical motion displacements of the monitored points; for each row of monitored points in the monitored window, calculating a difference between a maximum value and a minimum value of horizontal motion displacements of the monitored points; and if the difference between the maximum value and the minimum value of the vertical motion displacements of the monitored points in each column and the difference between the maximum value and the minimum value of the horizontal motion displacements of the monitored points in each row of the monitored window are both less than a second threshold, determining all the monitored points in the monitored window as the object meeting the capture criterion, and adding the object and the location information of the object to the tracking list.

According to the method for vehicle blind zone detection as described above, performing tracking operations on an existing object, which has been detected and thus added to the tracking list, in one or more previous frame images preceding the current frame image captured by the camera, to obtain a new location information of the existing object in the current frame image, and determining whether to have the existing object remained in the tracking list in accordance with the new location information of the existing object and the detection scope includes: calculating, by the optical flow method, motion displacements in the current frame image for all the monitored points of the existing object in the tracking list; selecting a direction of a motion displacement with the most number of the monitored points of the existing object as a motion direction of the existing object; and updating the tracking list according to the motion direction of the existing object, wherein for each of the monitored points, if a vertical motion displacement of the monitored point is greater than zero and the absolute value of the vertical motion displacement of the monitored point is greater than a first threshold, the direction of motion displacement of the monitored point is forward; if the vertical motion displacement of the monitored point is less than zero and the absolute value of the vertical motion displacement of the monitored point is greater than the first threshold, the direction of motion displacement of the monitored point is backward; and if the absolute value of the vertical motion displacement of the monitored point is less than the first threshold, the direction of motion displacement of the monitored point is stationary.

According to the method for vehicle blind zone detection as described above, updating the tracking list according to the motion direction of the existing object includes: if the number of the monitored points, of each of which the direction of motion displacement is the motion direction of the existing object, is smaller than a third threshold, removing the existing object from the tracking list.

According to the method for vehicle blind zone detection as described above, updating the tracking list according to the motion direction of the existing object includes: removing monitored points, of which the directions of motion displacement are different from the motion direction of the existing object, from all the monitored points of the existing object.

According to the method for vehicle blind zone detection as described above, updating the tracking list according to the motion direction of the existing object includes: obtaining the new location information of the existing object in the current frame image according to the monitored points of the existing object which have not been removed; and determining, according to the new location information, whether the existing object is still in the detection scope in the current frame image, wherein, if it is determined that the existing object is not in the detection scope, removing the existing object from the tracking list; and, if it is determined that the existing object is in the detection scope, having the existing object remained in the tracking list and updating the monitored points of the existing object which have not been removed and the new location information.

According to the method for vehicle blind zone detection as described above, making a warning determination in accordance with the location information in the current frame image for all the objects remained in the tracking list includes: checking all the objects in the tracking list and the location information in the current frame image for all the objects, and if there is an object in the tracking list that is located within a warning scope, sending an warning message, wherein the warning scope is smaller than the detection scope.

The present disclosure has the advantages of a small calculation amount, a short time cost, high detection sensitivity, and a low possibility of failing to report, and the detected object is not limited to a specific category.

DETAILED DESCRIPTION

Figure 1A:
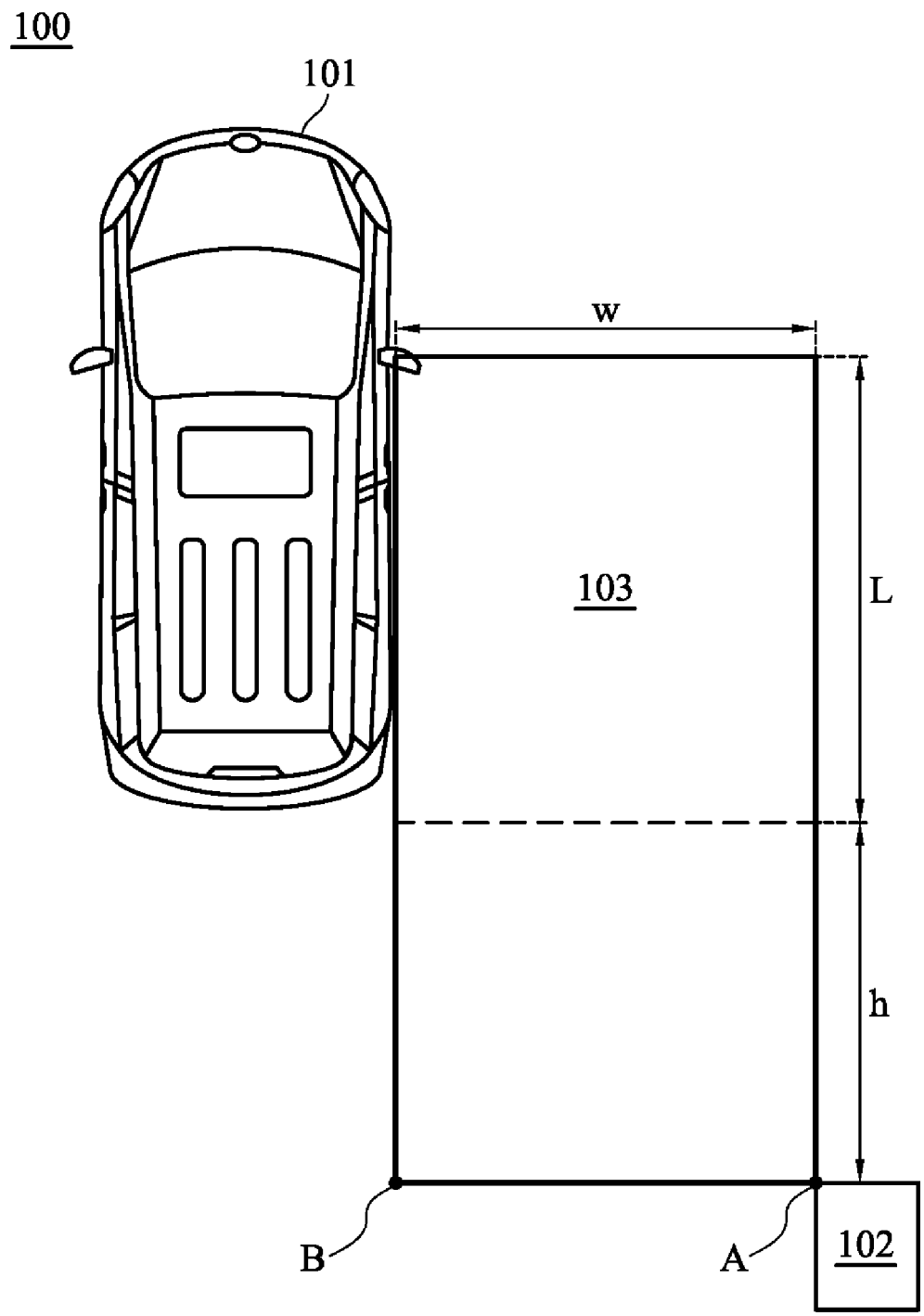
FIG. 1A is a schematic diagram of the vehicle and its blind zone detection scope according to an embodiment of the present disclosure.

FIG. 1A is a schematic diagram of the vehicle and its blind zone detection scope according to an embodiment of the present disclosure. As shown in FIG. 1A, the environment for vehicle blind zone detection 100 includes a vehicle 101, a predetermined vehicle blind zone detection scope 103 (in fact, there may be a detection scope on the left side and/or a detection scope on the right side of the vehicle, FIG. 1A only shows the vehicle blind zone detection scope on the right side of the vehicle 101, and the following embodiments are described only with vehicle blind zone detection scope on the right side), and a target object 102. A camera (not shown) is mounted on the rear view mirror on the right side of the vehicle 101 for capturing a plurality of frame images of the predetermined vehicle blind zone detection scope 103. The camera transmits the captured plurality of frame images of the predetermined vehicle blind zone detection scope 103 to a processing unit (not shown) of an electronic device in the vehicle 101 in a wired or wireless manner. The electronic device may be embedded vehicle equipment or external vehicle equipment. The processing unit may be a processor of embedded vehicle equipment (e.g., a vehicle machine system) or a processor of external vehicle equipment (e.g., a personal portable navigation device, a smart phone, etc.) and performs, from a current frame image captured by the camera, detection on an object (not shown) entering the predetermined vehicle blind zone detection scope 103. The object may be any type of vehicle, person, or obstacle on the road that may threaten the driving safety. In another embodiment, the vehicle 101 may be provided with one or more cameras coupled to the electronic device.

1. Determining the Blind Zone Detection Scope

The processing unit may determine a range for the predetermined vehicle blind zone detection scope 103 first. In this embodiment, as shown in FIG. 1A, the processing unit sets the predetermined vehicle blind zone detection scope 103 to be a range lateral to the vehicle 101 extending from the right mirror of the vehicle 101 to h meters posterior to the rear of the vehicle, with a width of w meters. Assuming that the distance from the right mirror of the vehicle 101 to the rear of the vehicle is L meters, the processing unit will detect the object when the object enters the range for the predetermined vehicle blind zone detection scope 103, as shown in FIG. 1A, of w meters wide and L+h meters long. After the vertical line of the images captured by the camera disposed on the right mirror of the vehicle 101 has been ensured to be parallel to the vertical line of a building, a calibrating staff may place a target object 102 behind the vehicle, with w meters lateral to the vehicle and h meters posterior to the rear of the vehicle. The processing unit marks the coordinates of the target object 102 on the image as A, and marks a point, behind the rear of the vehicle, on the same horizontal line as the target object 102 in the image as B. Thus, the line segment AB is a monitored segment.

In a further embodiment, the calibrating staff may first place a template on the road surface, so that the processing unit may calibrate in the camera image the coordinates of specific points on the template, thereby obtaining a transfer relationship between the actual physical coordinates on the road surface and the coordinates on the image. Then, the calibrating staff or the vehicle user may set the values of w and h through the electronic device, and the processing unit calculates the coordinates of the monitored segment AB on the image from the coordinate transfer relationship and the values of w and h, without using the target object 102.

2. Pre-Processing on Camera Images

After the range of the predetermined vehicle blind zone detection scope 103 has been determined, the processing unit performs pre-processing on the images input from the camera, including generating a sequence of images for a plurality of frame images of the predetermined vehicle blind zone detection scope 103 captured by the camera, grayscaling the plurality of frame images, and scaling the plurality of frame images to an appropriate size, so as to prepare a current frame image and one or more previous frame images for subsequent calculations using the optical flow method. In this embodiment, the processing unit adjusts the plurality of frame images to 300×200 pixels (this value is merely an example to illustrate the embodiment, and the present disclosure is not limited to this dimension). In a further embodiment, if the image input by the camera has been gray-scaled already, or has an appropriate size already, the processing unit then may not perform the pre-processing of gray-scaling or resizing.

3. Detecting the Current Frame and Capturing the Object

Figure 1B:
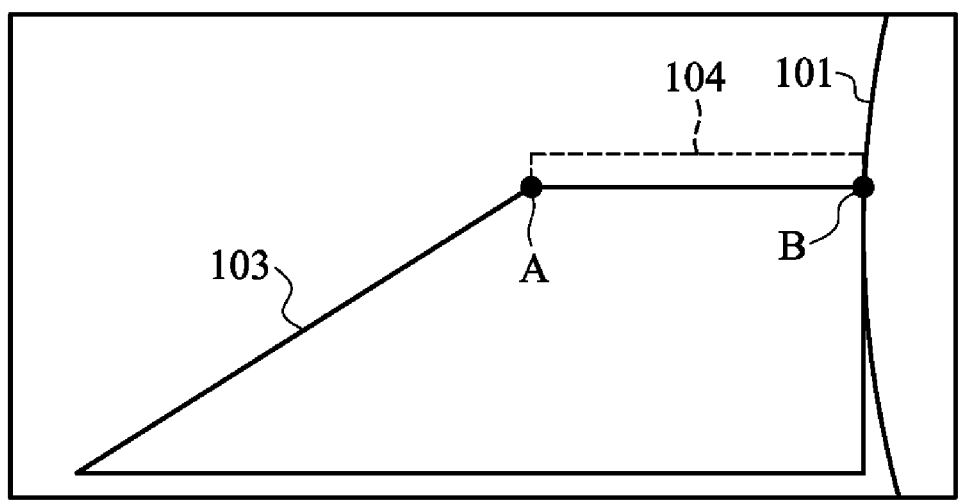
FIG. 1B is a schematic diagram of the camera image according to an embodiment of the present disclosure.
Figure 1B:
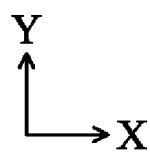

The processing unit detects the object entering the capture zone 104 corresponding to the predetermined vehicle blind zone detection scope 103. As shown in FIG. 1B, the object meeting the capture criterion is added to a tracking list. The tracking list records one or more objects in the current frame image and location information thereof. For example, as shown in the schematic diagram of the camera image of FIG. 1B, when the object enters the capture zone 104 in the current frame image, the processing unit detects the object and subsequently records in the tracking list the location information of the coordinates of the object in the current frame image. In an embodiment, in the tracking list, each object is recorded in form of a plurality of monitored points in the image (i.e., specific pixels as described later).

Specifically, prior to detecting an object entering the capture zone 104, the processing unit sets up a capture zone 104 in the current frame image, wherein the capture zone 104 is a rectangular range structured with the monitored segment formed by the line segment AB shown in FIG. 1B as the bottom and a capture height as the height. In the present embodiment, the capture height is a height of 15 pixels in the current frame image (this value is merely an example to illustrate the embodiment, and the present disclosure is not limited to this dimension). Then, in this embodiment, the processing unit further generates an array of monitored points (not shown) composed of a plurality of monitored points in the capture zone 104, wherein two adjacent monitored points in each column of the array are separated by 3 pixels therebetween, and two adjacent columns in the array are also separated by 3 pixels therebetween. In other words, in the capture zone 104 the adjacent monitored points are separated by 3 pixels therebetween in both the horizontal direction (the x-axis direction in FIG. 1B) and the vertical direction (the y-axis direction in FIG. 1B). However, the present disclosure is not limited to this.

Subsequently, the processing unit obtains the motion displacement of each of the monitored points in the current frame image by calculations using the optical flow method. In this embodiment, the processing unit further divides the array of monitored points in the capture zone 104 into a plurality of monitored windows, each of which includes a part of the monitored points, and performs a forward motion check on the monitored points of each monitored window, to check whether the directions of motion displacement of all the monitored points in the monitored window are forward. In a further embodiment, the order of the steps of calculations using the optical flow method and the division of the capture zone 104 into a plurality of monitored windows is not limited, or the two steps may be performed simultaneously. In the present embodiment, the size of each monitored window is 15×15 pixels, and the present disclosure is not limited to this. In the forward motion check, for each monitored point in the current frame image, the motion displacement calculated by the optical flow method includes a vertical motion displacement ($\Delta y$) and a horizontal motion displacement ($\Delta x$); for a monitored point, if $\Delta y>0$ and $|\Delta y|$ is larger than a first threshold, the processing unit determines that the direction of motion displacement of the monitored point is forward; if $\Delta y<0$ and $|\Delta y|$ is larger than the first threshold, the processing unit determines that the direction of motion displacement of the monitored point is backward; and if $|\Delta y|$ is smaller than the first threshold, the processing unit determines that the motion direction of the monitored point is stationary. In the present embodiment, the first threshold is 0.1 pixel (this value is merely an example to illustrate the embodiment, and the present disclosure is not limited to this value).

And then, the processing unit counts the numbers of monitored points with the directions of motion displacement of forward, backward, and stationary for all the monitored points in each monitored window individually. When the processing unit determines that the directions of motion displacements of the monitored points in a monitored window are all forward, the processing unit performs a check on the consistency in the motion displacements for all the monitored points in the monitored window. If not all of the monitored points in the monitored window have a forward motion displacement, the check on the consistency in the motion displacements of the monitored points in the monitored window is not performed, and the check on the monitored window is interrupted; then the forward motion check is performed on the monitored points in the next monitored window. In the check on the consistency in the motion displacements, the processing unit obtains the maximum and minimum values of the vertical motion displacements ($\Delta y$) and that of the horizontal motion displacements ($\Delta x$) in the current frame image for the monitored points of the monitored window in the capture zone 104, and has them marked as Max ($\Delta y$), Min ($\Delta y$), Max ($\Delta x$), and Min ($\Delta x$), respectively. In this embodiment, if the difference between the maximum value and the minimum value of the vertical motion displacements of the monitored points in each column in the monitored window is less than a second threshold, that is, if in each column, Max($\Delta y$)−Min($\Delta y$)<(the second threshold), the processing unit determines that the vertical motion displacements of the monitored points in the columns of the monitored window are consistent. If the difference between the maximum value and the minimum value of the horizontal motion displacements of the monitored points in each row in the monitored window is less than the second threshold, that is, if in each row Max($\Delta x$)−Min($\Delta x$)<(the second threshold), the processing unit determines that the horizontal motion displacements of the monitored points in the rows of the monitored window are consistent. In this embodiment, the second threshold may be 1 pixel (this value is only an example for illustrating the embodiment, and the present disclosure is not limited to this value). If there is a monitored window in which all the monitored points meet the above-described check on motion displacement consistency, the processing unit determines that an object passes and fills the monitored window; in other words, all the monitored points in the monitored window will be determined by the processing unit as one of the objects that meet the capture criteria.

4. Performing Tracking Operations on an Existing Object which was Added to the Tracking List in Previous Frame Images In this section, the processing unit performs tracking operations on one or more existing objects that were detected and thus added to the tracking list in one or more previous frame (i.e., frames 1, 2, . . . , n−1) images preceding the current frame (frame n) image in the sequence of images and are not removed yet (described later), so as to obtain new location information of the one or more existing objects in the current frame image for determining whether to have the one or more existing objects remained in the tracking list. It should be noted that when the current frame is the first frame (i.e., n=1) in the sequence of images, there is no existing object in the tracking list, then the processing unit may not perform the steps of this section. In this embodiment, the processing unit obtains the motion displacements of all the monitored points included in each existing object in the current frame image by calculations using the optical flow method. The processing unit determines the motion direction for each existing object in the current frame image according to the directions of motion displacements of all the monitored points included in the existing object. The processing unit first counts the number of monitored points, of the existing object, corresponding to each direction of motion displacement, wherein the direction of motion displacement of each monitored point of the existing object is determined in the same manner as the above determinations on the forward, backward, or stationary directions of motion displacement for the monitored points according to the vertical motion displacements ($\Delta y$) of the monitored points and the first threshold, and will not be repeated here. Next, the processing unit selects the direction (i.e., forward, backward, or stationary) of motion displacement with the most monitored points as the motion direction of the existing object.

In an embodiment, after the determination on the motion direction of the existing object, the processing unit may further confirm whether the number of the monitored points, having the same direction of motion displacement as the motion direction of the existing object, is greater than a third threshold, so as to confirm whether the monitored points contained in the existing object are sufficiently accurate. If the number of the monitored points of the same direction of motion displacement as the motion direction of the existing object is less than or equal to the third threshold, which means that the calculation results of the optical flow method for recording the monitored points of the existing object are incoherent, then the processing unit determines that the monitored points are of low accuracy, and the existing object is removed from the tracking list and no longer tracked. If the number of the monitored points of the same direction of motion displacement as the motion direction of the existing object is greater than the third threshold, the processing unit determines that the motion direction is indeed the motion direction of the existing object. In an embodiment, the third threshold may be set to 4 when the total number of the monitored points of the existing object is less than 8, and may be set to half of the total number of the monitored points of the existing object when the total number of the monitored points is greater than 8. However, the present disclosure is not limited to this, and may be appropriately adjusted according to actual conditions and needs.

In an embodiment, after determining the accuracy of the monitored points, the processing unit may further have all the monitored points of the existing object rechecked to remove those of the monitored points having a direction of motion displacement different from the motion direction of the existing object from the tracking list, and have only the monitored points conforming to the motion direction of the existing object remained. In other embodiments, the processing unit may also omit the above step of determining the accuracy of the monitored points and/or the above step of rechecking all the monitored points, so as to save the computing time.

Subsequently, the processing unit obtains new location information of the existing object in the current frame image according to the calculation results on the remained monitored points of the existing object by the optical flow method, and determines, according to the new location information, whether the existing object is still within the predetermined vehicle blind zone detection scope 103 in the current frame image. If the existing object is not in the predetermined vehicle blind zone detection scope 103, it is removed from the tracking list. If the existing object is still in the predetermined vehicle blind zone detection scope 103, it is remained in the tracking list, and the monitored points of the existing object which are not removed and the new location information are updated, so that the tracking on the existing object continues.

5. Adding an Object Captured in the Current Frame and the Location Information Thereof to the Tracking List After having the actions of "3. Detecting the current frame and capturing the object" and "4. Performing tracking operations on an existing object which was added to the tracking list in previous frame images" completed, the processing unit records all the monitored points in the monitored window, which have been determined as meeting the capture criterion in the action of "3. Detecting the current frame and capturing the object", in the tracking list as one object, and adds the location information of the object to the tracking list.

6. Making a Warning Determination

Finally, the processing unit makes a warning determination according to all the objects remaining in the tracking list (including all the objects captured in the current frame and all the existing objects that have not been removed) and the location information thereof in the current frame image. In this embodiment, the processing unit checks all the objects in the tracking list and their location information, and sends a warning message if there is an object located within a warning scope. The processing unit may alert the driver by sound or voice, and may simultaneously display the warning message on a display screen of the electronic device. The warning scope may be equal to the predetermined vehicle blind zone detection scope 103, or may be smaller than the predetermined vehicle blind zone detection scope 103, and the setting of the warning scope may be made according to actual needs.

Figure 2:
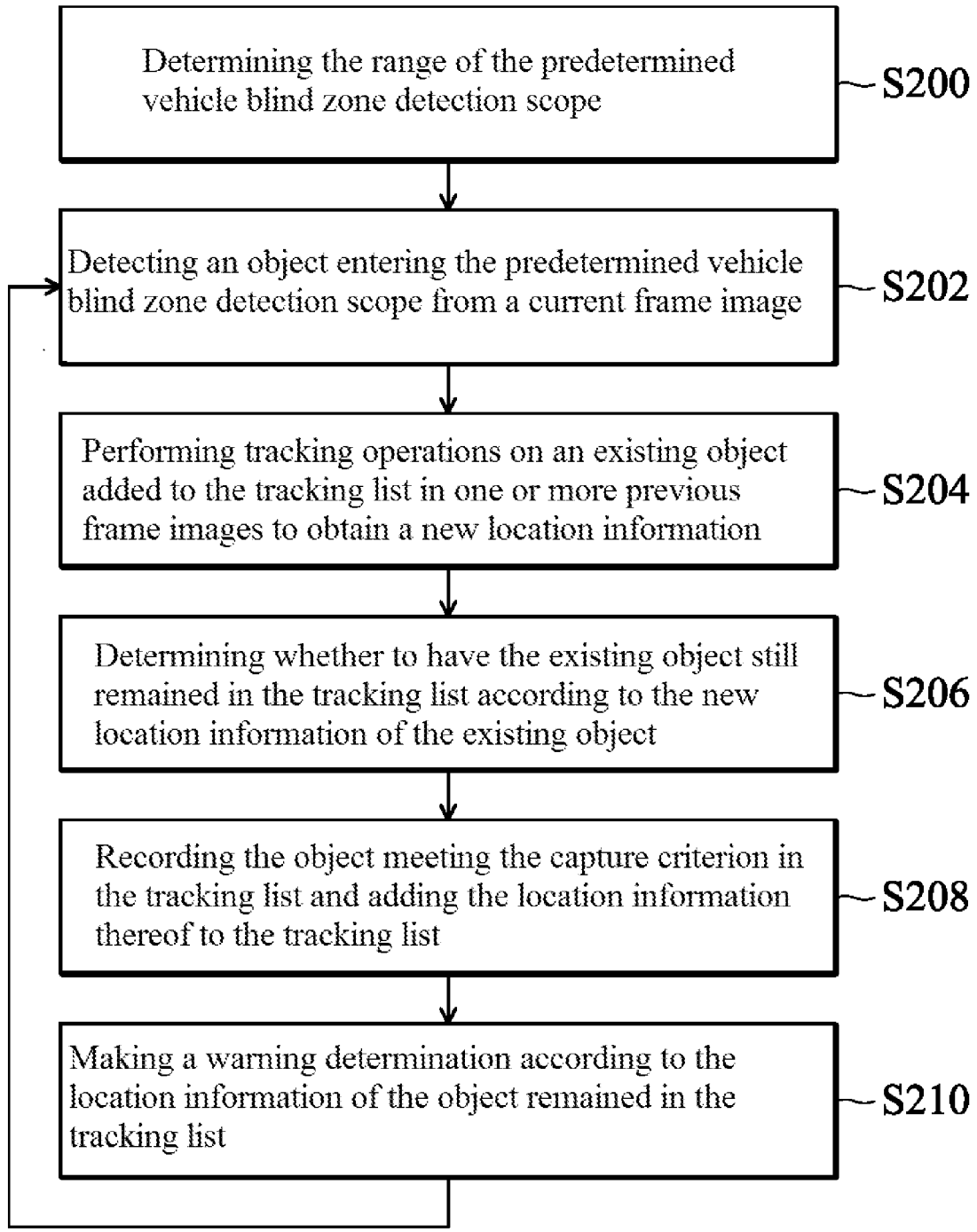
FIG. 2 is a flowchart of the vehicle blind zone detection according to an embodiment of the present disclosure. Reference numerals used in the drawings include: 100 environment for vehicle blind zone detection; 101 vehicle; 102 target object; 103 predetermined vehicle blind zone detection scope; and 104 capture zone.

FIG. 2 is a flowchart of the vehicle blind zone detection according to an embodiment of the present disclosure. As shown in FIG. 2, firstly, the processing unit may determine the range of the predetermined vehicle blind zone detection scope 103 (S200), wherein the determination on the range of the predetermined vehicle blind zone detection scope 103 is made in the manner as described in detail in the section "1. Determining the blind zone detection scope". In other embodiments, if the predetermined vehicle blind zone detection scope 103 has been set in advance, the processing unit may omit this step. The processing unit then detects an object entering the capture zone 104 corresponding to the predetermined vehicle blind zone detection scope 103 from a current frame image (S202), wherein the object meeting the capture criterion is added to a tracking list in subsequent steps. The specific execution of the step S202 has been described in the section "3. Detecting the current frame and capturing the object". In addition, the processing unit performs tracking operations on an existing object that is detected and thus added to the tracking list in one or more previous frame images preceding the current frame image, to obtain new location information of the existing object in the current frame image (S204), for determining whether to have the existing object still remained in the tracking list (S206); wherein the specific executions of steps S204, S206 have been described in the section "4. Performing tracking operations on an existing object which was added to the tracking list in previous frame images". Subsequently, the processing unit records the object determined in step S202 as meeting the capture criterion in the tracking list and adds the location information thereof to the tracking list (S208), wherein the specific execution of step S208 has been described in the section "5. Adding an object captured in the current frame and the location information thereof to the tracking list". Finally, the processing unit makes a warning determination according to the objects remained in the tracking list and their location information in the current frame image (S210), wherein the specific execution of step S210 has been described in the section "6. Making a warning determination". After determining whether to warn the driver or not, the processing returns to step 202 where a new frame image in the sequence of images is used as a new current frame image, and the detection on objects entering the predetermined vehicle blind zone detection scope 103 continues.

The afore-mentioned calculating process for the optical flow method performed by the processing unit may refer to many existing optical flow methods, and will not be described in detail herein. General optical flow methods are applicable herein. Relatively speaking, the sparse optical flow method is more suitable for the present disclosure (due to its high operation speed). However, the use of dense optical flow method will not affect the correctness, but only with more redundant calculations, which causes the operation speed unable to meet the real-time requirements. In this embodiment, the Lucas-Kanade (LK) Optical Flow Method included in the sparse optical flow method is employed as the optical flow method for the present disclosure. In addition, a Fleet-Jepson Optical Flow Method, a Horn-Schunck Optical Flow Method, and the likes may be used.

It should be noted that, in this embodiment, the processing unit may first detect the object entering the capture zone 104 corresponding to the predetermined vehicle blind zone detection scope 103 from the current frame image captured by the camera (see the section "3. Detecting the current frame and capturing the object" and step S202 shown in FIG. 2), and then perform tracking operations on the existing object that is detected and thus added to the tracking list in one or more previous frame images preceding the current frame image captured by the camera, so as to determine whether to have the existing object remained (the section of "4. Performing tracking operations on an existing object which was added to the tracking list in previous frame images" and steps S204 and S206 shown in FIG. 2). Alternatively, in another embodiment, the processing unit may first perform tracking operations on the existing object detected and thus added to the tracking list in one or more previous frame images preceding the current frame image captured by the camera, so as to determine whether to have the existing object remained (steps S204 and S206), and then detect the object entering the capture zone 104 corresponding to the predetermined vehicle blind zone detection scope 103 (step S202). In a further embodiment, the steps S204 and S206 may be performed at the same time with the step S202. In other words, the action of detecting the current frame and capturing the object, and the action of performing tracking operations on the existing object added to the tracking list in the previous frame images, which are performed by the processing unit, do not conflict, and may be executed regardless of the execution order or independently at the same time.

By the vehicle blind zone detection method according to the present disclosure, it is possible to detect, track and give a warning about the objects approaching and entering the blind zones lateral to the vehicle. Moreover, the detected object is not limited to a specific category such as vehicles, but may be widely applicable for detections of the approach of various moving objects such as vehicles, motorcycles, bicycles or pedestrians, so the present disclosure provides a blind zone detection mechanism that is generally applicable to various types of vehicles and driving scenarios. Though the embodiments of the present disclosure take the blind zone detection device of the present disclosure and its workflow on common civilian cars as an example, to describe the problem-solving mechanism of the present disclosure, the present disclosure is neither limited to be used for civilian cars only, nor limited to a specific number of cameras deployed. It is also applicable to various types of vehicles, as well as to scenarios of joint detection with a variety of blind zone detection scopes and multiple cameras.

The vehicle blind zone detection method of the present disclosure uses the optical flow method for the calculations of an array of monitored points of a specific area, and determines whether a moving object is approaching and entering the blind zone of the vehicle based on the characteristics of the motion displacements of the array of monitored points. The method has the advantages of small calculation amount and low time consumption, being suitable for the application scenarios like vehicle equipment where the computing capability power is limited, and meeting the real-time requirements in practice. Unlike many existing blind zone detection methods based on computer visual processing technology, which mainly targets on vehicles, the object to be detected by the device and the method according to the present disclosure is not limited to any specific category. In addition to all kinds of large vehicles and small cars, motorcycles, bicycles, pedestrians, etc. may also be detected effectively. The method provides high detection sensitivity and a low possibility of failing to report. A very low false alarm rate would be achieved by threshold adjustment in the conditions for motion displacement characteristic checking.

Although the embodiments of the present disclosure have been described above, it will be appreciated that the present disclosure is not limited to the disclosed embodiments. A number of variations and modifications may occur to those skilled in the art without departing from the scopes and spirits of the described embodiments. Therefore, it is intended that the scope of protection of the present disclosure is defined by the appended claims.

What is claimed is:

1. A method for vehicle blind zone detection, applied to an electronic device arranged on a vehicle to detect in a detection scope, the electronic device is coupled to a camera arranged on the vehicle, the method comprising:
    setting a capture zone in a current frame image captured by the camera; wherein the capture zone is a generally rectangular region defined by a distance w extending laterally from a side of the vehicle and a distance h extending longitudinally from a rear end of the vehicle, wherein setting a capture zone in a current frame image captured by the camera and detecting an object entering the capture zone in the current frame image includes:
        generating, in the capture zone, an array of monitored points including a plurality of monitored points, and dividing the array of monitored points into a plurality of monitored windows, wherein each of the monitored windows includes a part of the plurality of monitored points;
        calculating, by optical flow method, a motion displacement of each of the plurality of monitored points in the current frame image; and
        for each of the monitored windows, in response to the directions of motion displacements of all the monitored points in the monitored window being forward, checking consistency in the motion displacements of all the monitored points in the monitored window;
        for each of the monitored windows, in response to the directions of motion displacements of all the monitored points in the monitored window not being forward, performing no checking on the consistency in the motion displacements of the monitored points in the monitored window;
    generating a sequence of images from the camera for a plurality of image frames and pre-processing the images to prepare the current frame and at least one previous frame for subsequent calculations;
    detecting an object entering the capture zone in the current frame image, by analyzing the pre-processed images, wherein the object meeting a capture criterion and a location information of the object meeting the capture criterion are added into a tracking list;
    performing tracking operations on an existing object, which has been detected and thus added to the tracking list, in one or more previous frame images preceding the current frame image captured by the camera, to obtain a new location information of the existing object in the current frame image, and determining whether to have the existing object remained in the tracking list in accordance with the new location information of the existing object and the detection scope; and
    making a warning determination in accordance with the location information in the current frame image for all the objects remained in the tracking list.

2. The method for vehicle blind zone detection according to claim 1, wherein the one or more cameras are mounted on the left side and/or the right side of the vehicle, the detection scope includes a range on the left side of the vehicle from the left rear view mirror to a monitored segment posterior to the left rear of the vehicle and/or a range on the right side of the vehicle from the right rear view mirror to a monitored segment posterior to the right rear of the vehicle, and the monitored segment is corresponding to the bottom of the capture zone.

3. The method for vehicle blind zone detection according to claim 1, wherein the method further comprises:
    generating a sequence of images for a plurality of frame images captured by the camera and gray-scaling the plurality of frame images, and
    resizing the plurality of frame images, wherein the plurality of frame images include the current frame image and the one or more previous frame images.

4. The method for vehicle blind zone detection according to claim 1, wherein checking consistency in the motion displacements of all the monitored points in the monitored window includes:
    for each column of monitored points in the monitored window, calculating a difference between a maximum value and a minimum value of vertical motion displacements of the monitored points;
    for each row of monitored points in the monitored window, calculating a difference between a maximum value and a minimum value of horizontal motion displacements of the monitored points; and
    in response to the difference between the maximum value and the minimum value of the vertical motion displacements of the monitored points in each column and the difference between the maximum value and the minimum value of the horizontal motion displacements of the monitored points in each row of the monitored window both being less than a second threshold, determining all the monitored points in the monitored window as the object meeting the capture criterion, and adding the object and the location information of the object to the tracking list.

5. The method for vehicle blind zone detection according to claim 1, wherein making a warning determination in accordance with the location information in the current frame image for all the objects remained in the tracking list includes:
    checking all the objects in the tracking list and the location information in the current frame image for all the objects, and if there is an object in the tracking list that is located within a warning scope, sending an warning message, wherein the warning scope is smaller than the detection scope.

6. The method of claim 1, wherein the distance w and the distance h are user adjustable.

7. A method for vehicle blind zone detection, applied to an electronic device arranged on a vehicle to detect in a detection scope, the electronic device is coupled to one or more cameras arranged on the vehicle, the method comprising: setting a capture zone in a current frame image captured by the camera and detecting an object entering the capture zone in the current frame image, wherein the object meeting a capture criterion and a location information of the object meeting the capture criterion are added into a tracking list; performing tracking operations on an existing object, which has been detected and thus added to the tracking list, in one or more previous frame images preceding the current frame image captured by the camera, to obtain a new location information of the existing object in the current frame image, and determining whether to have the existing object remained in the tracking list in accordance with the new location information of the existing object and the detection scope; and making a warning determination in accordance with the location information in the current frame image for all the objects remained in the tracking list; wherein setting a capture zone in a current frame image captured by the camera and detecting an object entering the capture zone in the current frame image includes: generating, in the capture zone, an array of monitored paints including a plurality of monitored points, and dividing the array of monitored points into a plurality of monitored windows, wherein each of the monitored windows includes a part of the plurality of monitored points; calculating, by optical flow method, a motion displacement of each of the plurality of monitored points in the current frame image; and for each of the monitored windows, if the directions of motion displacements of all the monitored points in the monitored window are forward, checking consistency in the motion displacements of all the monitored points in the monitored window; otherwise, no checking on the consistency in the motion displacements of the monitored points in the monitored window; wherein performing tracking operations on an existing object, which has been detected and thus added to the tracking list, in one or more previous frame images preceding the current frame image captured by the camera, to obtain a new location information of the existing object in the current frame image, and determining whether to have the existing object remained in the tracking list in accordance with the new location information of the existing object and the detection scope includes: calculating, by the optical flow method, motion displacements in the current frame image for all the monitored points of the existing object in the tracking list; selecting a direction of a motion displacement with the most number of the monitored points of the existing object as a motion direction of the existing object; and updating the tracking list according to the motion direction of the existing object, wherein for each of the monitored points, if a vertical motion displacement of the monitored point is greater than zero and the absolute value of the vertical motion displacement of the monitored point is greater than a first threshold, the direction of motion displacement of the monitored point is forward; if the vertical motion displacement of the monitored point is less than zero and the absolute value of the vertical motion displacement of the monitored point is greater than the first threshold, the direction of motion displacement of the monitored point is backward; and if the absolute value of the vertical motion displacement of the monitored point is less than the first threshold, the direction of motion displacement of the monitored point is stationary.

8. The method for vehicle blind zone detection according to claim 7, wherein updating the tracking list according to the motion direction of the existing object includes:
if the number of the monitored points, of each of which the direction of motion displacement is the motion direction of the existing object, is smaller than a third threshold, removing the existing object from the tracking list.

9. The method for vehicle blind zone detection according to claim 7, wherein updating the tracking list according to the motion direction of the existing object includes:
removing monitored points, of which the directions of motion displacement are different from the motion direction of the existing object, from all the monitored points of the existing object.

10. The method for vehicle blind zone detection according to claim 7, wherein updating the tracking list according to the motion direction of the existing object includes:
obtaining the new location information of the existing object in the current frame image according to the monitored points of the existing object which have not been removed; and
determining, according to the new location information, whether the existing object is still in the detection scope in the current frame image,
wherein, if it is determined that the existing object is not in the detection scope, removing the existing object from the tracking list; and, if it is determined that the existing object is in the detection scope, having the existing object remained in the tracking list and updating the monitored points of the existing object which have not been removed and the new location information.

* * * * *